M. E. PARRY.
STOVEPIPE JOINT.
APPLICATION FILED DEC. 7, 1910.

1,011,363.

Patented Dec. 12, 1911.

UNITED STATES PATENT OFFICE.

MARVIN E. PARRY, OF SYRACUSE, NEW YORK, ASSIGNOR TO DAYTON R. FRITTS, OF SYRACUSE, NEW YORK.

STOVEPIPE-JOINT.

1,011,363.  Specification of Letters Patent.  Patented Dec. 12, 1911.

Application filed December 7, 1910. Serial No. 596,105.

*To all whom it may concern:*

Be it known that I, MARVIN E. PARRY, a citizen of the United States, and resident of Syracuse, in the county of Onondaga, in the State of New York, have invented new and useful Improvements in Stovepipe-Joints, of which the following, taken in connection with the accompanying drawings, is a full, clear, and exact description.

This invention relates more particularly to stove-pipes and resides in the novel manner of joining two sections, the main object being to provide a simple and reliable connection for the sections which shall effect a rigid joint and at the same time can be produced at a small expense, and furthermore will permit the joining of several sections of a horizontally disposed stove-pipe without the use of wire generally required for sustaining a pipe of considerable length.

To that end the present invention consists in the peculiar formation of the end portion of the pipe section which is inserted in the adjoining section as hereinafter fully described and claimed.

Figure 1:
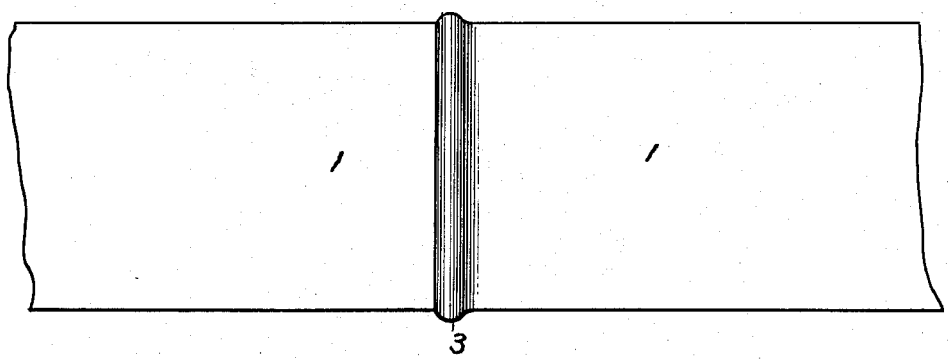
Figure 2:
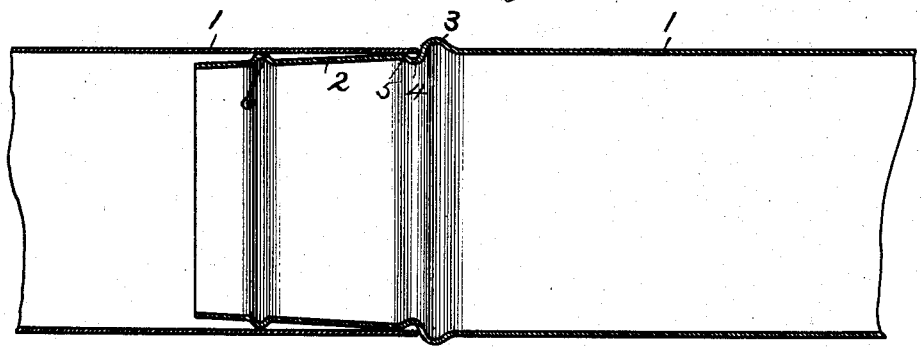

In the accompanying drawings Figure 1 is a side view of two sections of a pipe joined in accordance with my invention, and Fig. 2 is a longitudinal section of the same.

Referring to said drawings —1—1— denotes the two pipe-sections which telescope as usual. The inserted end portion of a section is provided with a taper as indicated at —2—, which taper is produced by crimping said portion longitudinally. This taper extends from an external circumferential bead —3— formed on the section, which bead constitutes a shoulder against which the plain cylindrical end portion of the outer section abuts. At the junction of the taper and bead —3— the inserted end portion of a section is formed with a circumferential groove —4— to produce an outward bulge —5— fitted tightly in the abutting end portion of the adjoining section. Some distance from the bulge —5— the tapered end portion is formed with a circumferential external bead —6— which is also fitted tightly in the end portion of the adjoining section.

It is obvious that the tapering of one end portion of a pipe-section will permit it to be easily and conveniently inserted in the plain cylindrical end portion of an adjoining section. The diameter of the tapered end portion of the section at the center of the bead and its diameter at the bulge correspond and the bead is comparatively close to the end of the taper whereby the said bead and bulge provide two remote contact points for the end portion telescoping over the said tapered portion, thereby producing a very rigid connection for the two sections.

What I claim is:—

A stove pipe joint, comprising a pipe section having one end cylindrical and the other tapering, the end of the cylindrical portion adjacent to the tapering portion being pressed outwardly to form a bead of greater diameter than said cylindrical portion, said pipe section being formed with an inturned bead at the large end of the tapering portion and adjacent to the outturned bead, said tapering portion being also provided with an outturned bead having its outer diameter substantially equal to the inner diameter of the cylindrical portion, the beads on the tapered portion of the pipe being spaced from each other and a separate pipe section having a cylindrical portion of substantially the same diameter as the cylindrical portion of the first named section and telescoping with the tapering portion of said first named section and having its inner end abutting against the outturned bead of the first mentioned cylindrical portion.

MARVIN E. PARRY.

Witnesses:
F. S. STOCKMAN,
WM. H. MEIER, Jr.